United States Patent [19]

Kubik

[11] Patent Number: 4,751,818

[45] Date of Patent: Jun. 21, 1988

[54] HYDRAULIC DRIVE SYSTEM FOR PLATEN

[76] Inventor: Philip A. Kubik, 1527 Lochridge, Bloomfield Hills, Mich. 48013

[21] Appl. No.: 907,805

[22] Filed: Sep. 16, 1986

[51] Int. Cl.$^4$ ............................................. F16D 31/02
[52] U.S. Cl. ..................................... 60/444; 60/415; 60/418; 60/484; 60/487; 60/488; 60/493
[58] Field of Search ................. 60/487, 488, 489, 325, 60/493, 464, 484, 372, 381, 443, 444, 415, 418

[56] References Cited

U.S. PATENT DOCUMENTS

| | | | |
|---|---|---|---|
| 3,921,503 | 11/1975 | Kubik | 60/444 X |
| 4,043,125 | 8/1977 | Kubik | 60/493 X |
| 4,220,004 | 9/1980 | Abeille et al. | 60/484 X |
| 4,431,064 | 2/1984 | Bright | 60/484 X |

Primary Examiner—Edward K. Look
Attorney, Agent, or Firm—Basile and Hanlon

[57] ABSTRACT

A hydraulic drive system for driving a platen in forward and return reciprocatory strokes includes a hydraulically driven reciprocable piston and a reversible rotary hydraulic motor having a crank coupled to the platen by a link. A hydraulic circuit employs a variable output pump connected via a reversible direction control valve to drive the piston and crank in unison to cooperatively drive the platen. The piston and crank motor are connected in parallel to the pump and the pump output is advantageously distributed variably between the piston and motor during the stroke cycle. Where the stroke of the platen is vertical, the system may include a hydraulic counterbalance circuit to counterbalance the weight of the platen. The pump output may be varied to control the velocity of the platen at selected points in its stroke.

5 Claims, 2 Drawing Sheets

HYDRAULIC DRIVE SYSTEM FOR PLATEN

BACKGROUND OF THE INVENTION

The present invention is particularly concerned with hydraulic drive systems employed to reciprocate a machine platen in a linear stroke where a rotary crank is coupled to the platen by a link—i.e. a slider crank mechanism in which the platen is the slider.

The rotary crank drive has several features which are advantageous in such a system, most notably the fact that the platen is smoothly decelerated to a stop at each end limit of movement and the geometry of the slider crank linkage is such that the drive is operating at a maximum mechanical advantage at the end of each stroke. The length of the stroke is positively and permanently established by the crank arm radius.

In some systems, however, the rotary crank drive also has certain inherent disadvantages. One example of such a system is that in which the platen is mounted for vertical movement and is required, at some point during its upward stroke, to engage and lift a workpiece from a fixture or conveyor to move the workpiece upwardly into engagement with a locating device to clamp the workpiece against the locating device while some operation is performed upon the workpiece. The characteristics of the rotary crank drive are such that, assuming a constant rotary speed of the crank, the upward velocity of the crank is a maximum at mid stroke, which would find the platen engaging the workpiece with a substantial impact if the rotary speed of the crank is not reduced prior to the engagement of the platen with the workpiece. At, or near mid stroke in such a system, the crank arm is in a substantially horizontal position and hence is operating at a minimum mechanical advantage. If the crank is slowed at mid stroke to minimize impact between the upwardly moving platen and the stationary workpiece, a substantial amount of power must be supplied to the crank drive motor to accelerate the platen back to its normal speed range after it has been slowed to pick up the part.

The present invention is especially directed to a hydraulic drive system in which the inherent advantages of the rotary crank drive described above are retained, while the drawbacks encountered in environments where the crank must be slowed at mid stroke are overcome.

SUMMARY OF THE INVENTION

In accordance with the present invention, which is described as applied to an apparatus in which a platen is moved in a vertical reciprocatory stroke and required to pick up a workpiece midway in its upward stroke, one or more vertically reciprocable hydraulic piston-cylinder motors are mounted and connected hydraulically to act in unison with the rotary crank drive to cooperatively raise and lower the platen. A reversible rotary hydraulic motor is employed to drive the crank in rotation, rotating the crank in one direction from a six o'clock position to a twelve o'clock position during the upward stroke and rotating the crank in the opposite direction to return it from the twelve o'clock position to the six o'clock position upon the downward stroke of the platen. The motor and hydraulic cylinders are connected in parallel in a closed loop system across a variable output pump via a four way reversing valve. The pump output, and hence the speed of the platen as driven by the crank and cylinders is varied by a control system programmed to vary the output of the pump at selected portions of the working cycle of the drive. Because the cylinders and rotary motor are connected in parallel with each other, and the pistons and crank are mechanically coupled to a rigid platen, the pump output is distributed between the cylinders and motor in a self proportioning manner in which the rotary motor receives a proportionately higher amount of working fluid near the ends of the platen stroke, while the proportionate flow of fluid to the hydraulic cylinders increases during the mid portion of the working stroke. This effectively shifts the major portion of the load to the power source which can most efficiently carry the load at that particular point in the working cycle.

The hydraulic cylinders, in the case of a vertically movable platen, may also be provided with a counterbalance chamber in which pressure from an accumulator may be continuously applied upwardly against the piston to counterbalance the weight of the platen.

Other objects and features of the invention will become apparent by reference to the following specification and to the drawings.

IN THE DRAWINGS

FIG. 1A is a cross-sectional view of one of the hydraulic cylinders of FIG. 1;

DESCRIPTION OF THE PREFERRED EMBODIMENT

Figure 1:
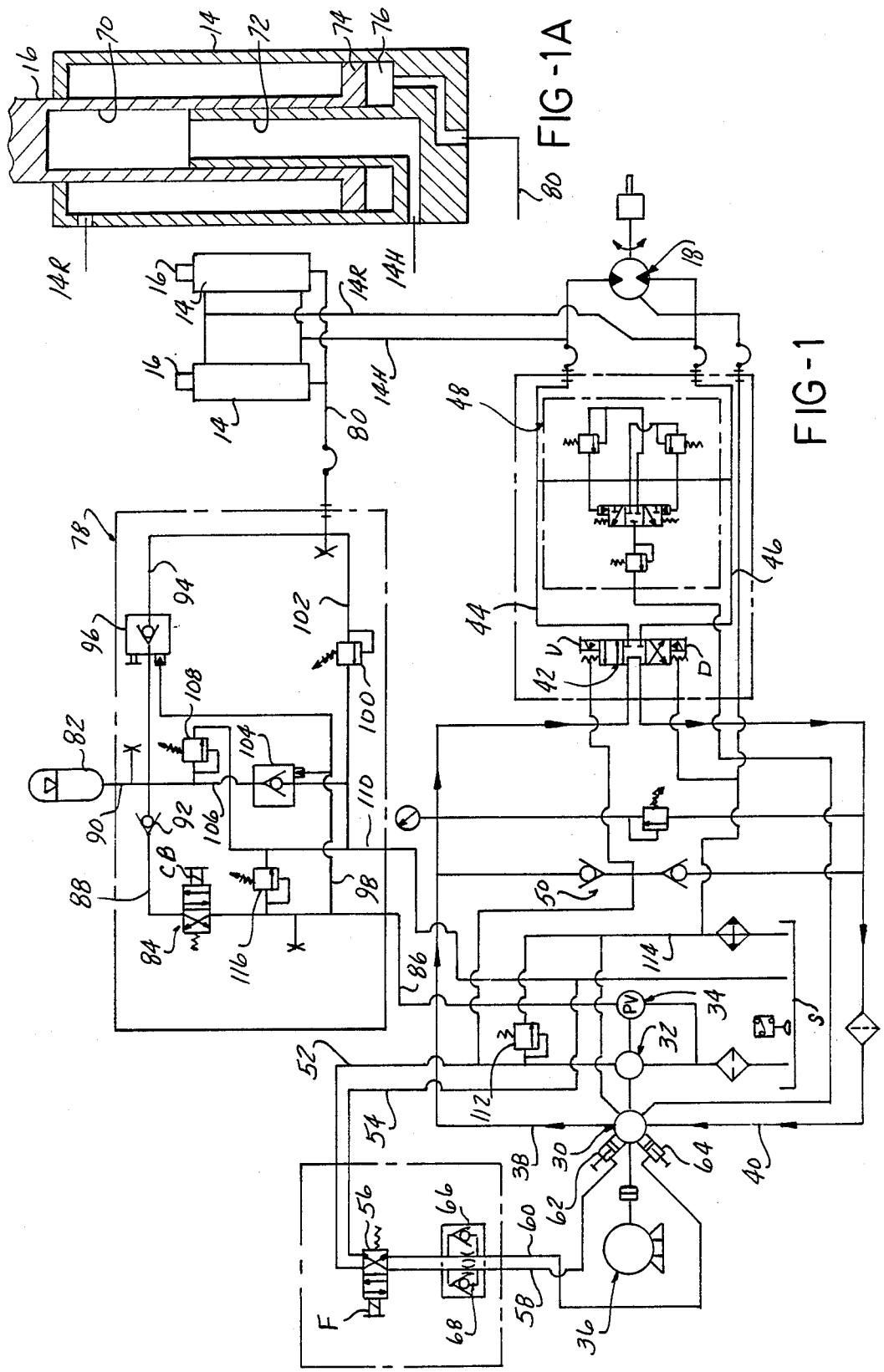
FIG. 1 is a schematic diagram of a hydraulic drive circuit embodying the present invention.
Figure 2:
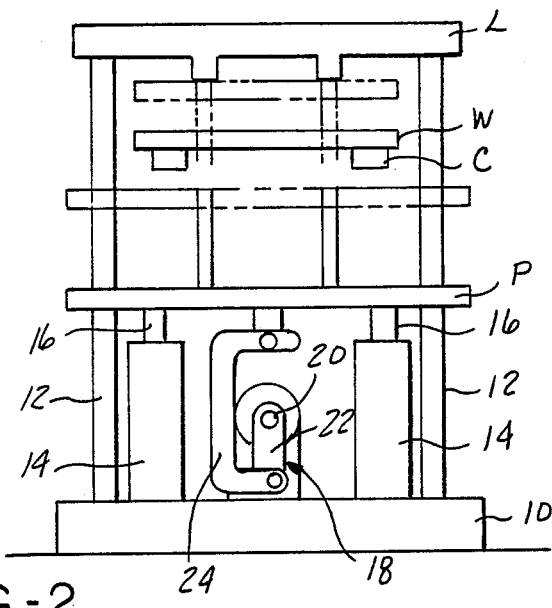
FIG. 2 is a schematic diagram of one form of machine tool employing the hydraulic circuit of FIG. 1.

In FIG. 2, a schematic diagram of an exemplary apparatus for which the hydraulic circuit of FIG. 1 is especially adapted is shown. The function of the apparatus of FIG. 2 is to operate in a working cycle in which a workpiece W is lifted by the upwardly moving platen P from a conveyor C, moved upwardly into engagement with a workpiece locating device L, and fixedly clamped against the locator L while some operation is performed upon workpiece W. When this operation is completed, the platen P is lowered to replace the workpiece W on conveyor C as the platen returns to its start position.

The apparatus of FIG. 2 includes a fixed base 10 upon which are fixedly secured a plurality of vertically extending guide rods 12 slidably received by the platen P to guide the platen in a vertical reciprocatory stroke between the full line position shown in FIG. 2 and the broken line position of FIG. 2. A pair of vertically disposed lift cylinders 14 are fixedly mounted upon base 10 and the piston rods 16 of cylinders 14 are fixedly secured to the underside of platen P. A reversible rotary hydraulic motor and gear box designated generally 18 is also mounted upon base 10 with its output shaft 20 rotatively locked to a crank 22 whose distal end is coupled to platen P by means of a link 24 pivotally connected at its opposite ends respectively to the crank and to the platen.

In FIG. 2, the apparatus is shown in its rest position at which the platen P is at its lowermost limit of movement. In this position, the piston rods 16 are fully retracted into their respective cylinders 14, while the crank 22 of the rotary hydraulic drive system 18 is in a six o'clock position relative to the axis of shaft 20. The system is so designed that upon rotation of crank 22 in a clockwise direction as viewed in FIG. 2, the vertical component of movement of the outer end of the crank is transmitted by link 24 to platen P to elevate the platen, the lift cylinders 14 simultaneously being supplied with fluid under pressure to vertically extend their piston rods 16. Crank 22 is rotated from the position shown in FIG. 2 through an angle of 180 degrees to the twelve o'clock position, at which time the workpiece W is clamped firmly against the locating device L. The platen P is then returned to its rest position by rotating crank 22 in a counterclockwise direction to return the crank from its twelve o'clock position back to the illustrated six o'clock position in FIG. 2.

The hydraulic circuit employed to operate the cylinders 14 and motor 18 in the foregoing cycle in accordance with the present invention is shown in FIG. 1.

Referring now to FIG. 1, a hydraulic drive system embodying the present invention includes a variable speed main system pump 30, a control system pump 32 and a counterbalance system pump 34, all of which are powered by a constant speed electric motor 36. Main system pump 30 is employed to drive lift cylinders 14 and the rotary lift motor 18 via a closed loop system in which outlet conduit 38 and inlet conduit 40 of pump 30 are connected to one side of a solenoid actuated directional control or reversing valve designated generally 42. At the opposite side of valve 42, its control ports are connected respectively to conduits 44 and 46 which in turn are connected to opposite sides of the reversible rotary lift motor 18. Lift cylinders 14 have their head ends and rod ends connected respectively to conduits 44 and 46 by conduits 14 H and 14 R so that the lift cylinders 14 are connected in parallel with lift motor 18, so that motor 18 and cylinders 14 drive upwardly or downwardly in unison. A shuttle relief valve manifold designated generally 48 is connected across conduits 44 and 46. The closed loop system may be charged and replenished with fluid by control system pump 32 via a replenishing circuit designated generally 50 connected to the outlet conduit 52 of pump 32.

Main system pump 30, as previously stated, is a variable speed pump, such as an axial piston pump in which the pump output is varied in accordance with the angle of inclination of a tiltable swash plate with respect to the pump axis. To vary the output of main system pump 30, outlet conduit 52 connected to control pump 32 and a return conduit 54 which leads to a sump S are connected through a solenoid actuated reversing valve 56 to conduits 58 and 60 which are in turn connected respectively to minimum and maximum speed stop devices 62 and 64 which control the inclination, and hence the output, of main system pump 30. When pressure is supplied to conduit 58, and hence minimum speed stop device 62, this device is driven in a direction moving a piston within the device away from a mechanical minimum speed stop. The piston of the speed stop is mechanically coupled to the swash plate of pump 30 and, in moving away from the minimum speed stop, the piston tilts the swash plate in a direction increasing the pump output. The swash plate in turn is mechanically coupled to a piston within the maximum speed stop device 64 which must move in a direction discharging fluid from the stop device 64 into conduit 60 which is connected by valve 56 to sump conduit 54 when conduit 58 is being supplied by pressure. The rate at which fluid can be discharged from maximum speed stop device 64 is restricted by an acceleration control designated generally 66 consisting of an adjustable restriction and one way check valve connected in parallel with each other in conduit 60. A similar deceleration control designated generally 68 is connected in conduit 58. The acceleration and deceleration controls 66 and 68 permit substantially unrestricted flow of fluid toward the associated speed stop device via the one way check valve, but throttle the flow of fluid away from the associated speed stop by requiring all of the fluid to pass through the adjustable restriction.

In systems where the platen to be driven by motor 18 moves in a vertical path, the lift cylinders 14 desirably may be modified in a manner such that they may substantially counterbalance the weight of the platen. Referring to FIG. 1A, as shown in the cross-sectional view of one of the cylinders, the piston rod 16 is provided with an axially extending blind bore 70 within which is slidably received a fixed tube 72 open at its upper end and fixedly secured to and sealed at its lower end to the lower end of cylinder 14 and hydraulically connected to head end conduit 14H. The cross-sectional area of bore 70 is made equal to that of the upper side of piston 74, to enable closed loop operation. The chamber 76 below piston 74 is connected to a source of counterbalancing pressure 78 via counterbalancing conduit 80 which exerts an upward force on piston 74 counterbalancing the weight of platen P.

The counterbalance system includes an accumulator 82 which is charged via a solenoid actuated valve 84 connected via conduit 86 to the outlet of counterbalance system pump 34. Valve 84 is connected to the accumulator 82 via conduits 88, 90, a one way check valve 92 being located in conduit 88 to accommodate flow through conduit 88 only in a direction toward accumulator 82. Accumulator 82 communicates with counterbalance conduit 80 via a conduit 94 having a pressure actuated valve 96. Valve 96 is held open at all times when a minimum pressure is present in the outlet conduit 86 of counterbalance pump 34 and its branch conduit 98 which is connected to valve 96. Thus at all times when counterbalance pump 34 is being driven, normally there is a free and unrestricted communication between accumulator 82 and the counterbalance chamber defined by chamber 76 within cylinders 14 so that fluid can freely flow in either direction to maintain a substantially constant pressure in the counterbalance chamber as the piston moves upwardly and downwardly in its working cycle.

If pump 34 should stop, valve 96 would seat upon the loss of pressure in branch conduit 98, thus trapping the fluid in conduit 80 and the counterbalance chamber defined by tube 76. Should the pressure in conduit 80 rise beyond a predetermined pressure, a relief valve 100 and conduit 102 would open to permit fluid in conduit 80 to flow through conduit 102 and valve 100, to a discharge conduit 110 which drains to sump S.

Valve 104 is similar in function to valve 96 except that valve 104 will be allowed to open upon the loss of pressure in conduit 98 thereby reducing pressure in accumulator 82 when motor 36 is shut off valve 108 will automatically open when the pressure in conduit 106 exceeds a predetermined pressure above the maximum accumulator pressure.

If it is desired to totally bleed conduit 80 when the counterbalance system pump 34 is not in operation, valve 96 may also be provided with a manual actuator so that it may be manually held open.

The system as shown in FIG. 1 is also provided with various relief valves, filters, oil coolers, etc., which function in a well known manner, but which are, per se, not directly involved with the present invention.

Figure 3:
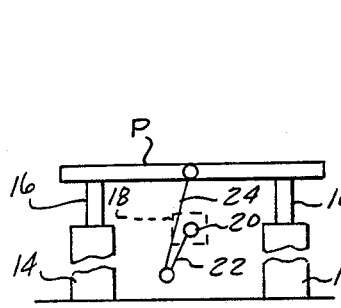
FIGS. 3, 4 and 5 are schematic diagrams of the apparatus of FIG. 2, showing various stages in the operation of the apparatus.
Figure 4:
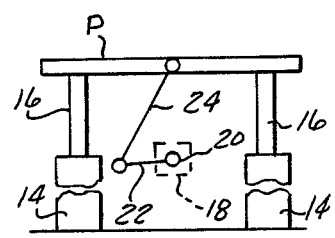
Figure 5:
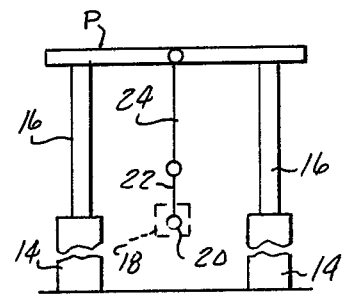

Referring now particularly to FIGS. 3, 4, and 5, the apparatus of FIG. 2 is shown in these Figures at different stages of its working stroke.

Referring briefly to FIG. 2, it will be recalled that the apparatus of FIG. 2, when driven upwardly from its rest position will move upwardly into engagement with the workpiece W and then lift the workpiece W upwardly to clamp it against the locating device L. On the subsequent downward stroke of the platen, the workpiece will be lowered downwardly and its support, during this downward stroke will be transferred from the platen to the workpiece conveyor C. The engagement and disengagement between the platen and workpiece thus occur approximately midway of the stroke of platen P.

Returning now to FIGS. 3-5, and assuming that piston rods 16 are disconnected from platen P so that the movement of the platen is entirely accomplished by rotary motor 18 acting through crank 22 and link 24 it will be seen that elevation of the platen by the action of the crank and link alone is not particularly advantageous. Assuming the crank to be driven at a constant rotary speed (a constant rate of flow through motor 18), the vertical velocity of platen P will not be constant, but will increase from zero at the six o'clock start position of crank 22 and reach a maximum at the time the crank 22 passes its nine o'clock position and then decrease to zero as crank 22 arrives at the twelve o'clock position shown in FIG. 5. The vertical component of the velocity of the crank transmitted by link 24 to the platen will approximate the sine of the angle between the crank 22 and a vertical line passing through its axis of rotation.

Thus, assuming a constant rotary velocity of crank 22, the vertical velocity of the platen will be at a maximum at the mid point of its stroke and, during its upward movement, it would move into contact with the workpiece W with a substantial impact. Similarly, on the downstroke, the workpiece supported by the platen would be moving at a relatively high velocity as it came into contact with the conveyor.

In that the speed or flow rate output of main system pump 30, which drives the crank in rotation via motor 18 may be varied, it would seem desirable to slow down pump 30, and hence motor 18 and crank 22 as the platen approached its mid stroke position from either direction to minimize the impact encountered by the workpiece. However, if the platen is to be driven entirely by the crank, the reactive moment exerted by the platen upon the crank is a maximum when the crank is at its nine o'clock position and hence if the rotary speed of the crank is reduced near mid stroke, a substantial reactive force will resist any effort to accelerate the crank to bring the crank back up to its normal rotary speed. The reactive force exerted by the platen may be best visualized as a moment induced by a force acting vertically downwardly at the outer end of the crank over an effective lever arm equal to the horizontal distance between the end of the crank arm and a vertical line passing through the crank axis.

The vertical velocity of piston rods 16, on the other hand, is independent of their displacement from the start position and is directly proportional to the flow rate of fluid under pressure into the chamber at the driving side of the piston. For a constant rate of flow, the piston will move with a constant velocity throughout its entire range of movement.

By employing the circuit of FIG. 1 to drive cylinders 14 and motor 18 in unison, the disadvantages of the crank described above are minimized by the cooperative action of the cylinders, while the advantages of the crank—smooth acceleration and deceleration from and to the end limits of the stroke, plus the mechanical locking of the platen in its extended position (see FIG. 5)—are retained.

At the beginning of the stroke of the system from its rest position, assuming a constant rate of flow of fluid at a constant pressure, under normal circumstances the initial vertical velocity of the piston rods would be much greater than the vertical component of velocity provided by the crank. However, both crank and pistons are mechanically linked to the rigid platen and, because of the parallel connection of cylinders 14 and motor 18 to the supply circuit, the pressure drop across the cylinders and across motor 18 must be constant and equal. In that the pistons cannot move upwardly as fast as they would if they were not coupled mechanically to the crank, pressurized fluid cannot flow into the cylinder as fast as it normally would and this excess flow is diverted, effectively, to the motor to cause the motor to drive somewhat faster than it normally would. Because at the beginning of the upward stroke of the platen, the mechanical advantage of the motor driven crank is at a maximum, essentially the motor at this stage carries most of the load of acceleration.

As the system approaches mid stroke, assuming a constant rate of flow of driving fluid, the vertical velocity of the crank arm increases, and the flow proportioning-load carrying situation is reversed from that which occurs at the beginning of the stroke. The vertical velocity component of the crank is now attempting to exceed the vertical velocity of the piston and the mechanical coupling via the platen between the crank and piston finds the motor not needing as much fluid to keep up with the piston. The excess flow is diverted to the piston to increase its velocity and share of the load.

OPERATION

Referring to FIG. 1, the various solenoid operated valves 42, 56 and 84 are shown in the position which the valve assumes when its controlling solenoid is de-energized. With electric motor 36 energized and driving the pumps 30, 32 and 34 and the various solenoid valves in the position shown in FIG. 1, main system pump 30 simply circulates fluid continuously from outlet conduit 38 to inlet conduit 40 via the connection established between these two conduits with valve 42 in its centered position.

Pump 32 has its outlet conduit 52 connected via solenoid valve 56 to maximum speed stop device 64 to drive the maximum speed stop piston away from its stop (to establish a minimum speed setting for pump 30), while the minimum speed stop device 62 is connected via conduit 58 through valve 56 to the sump conduit 54, allowing the minimum speed stop piston to move to its minimum speed stop. Pressure build up in the maximum speed stop device 64 will be relieved by a relief valve 112 connected to outlet conduit 52 of pump 32 which will open to vent fluid in sump S via conduit 114.

The outlet conduit 86 of the counterbalance system pump is blocked by valve 84 and pump 34 short strokes for zero displacement. Overpressure in conduit 86 is relieved by a relief valve 116 which, when open, connects conduit 86 to conduit 110 which goes to sump S.

Energization of the various solenoids to actuate their associated valves may be controlled by a suitable programmable controller responsive to the angular position of crank 22 which will be in the six o'clock position (FIG. 2) at the start of a cycle. Counterbalance system accumulator 82 is fully pressurized by pump 34 when the system is started. As will be apparent from the following description, accumulator 82 is conditioned to be topped off at the end of each cycle.

With the various solenoid valves in the position shown in FIG. 1 and the apparatus in the position shown in full line in FIG. 2 with piston rods 16 fully retracted and crank 22 in the illustrated six o'clock position, the programmable controller receives a cycle start signal which may be either manually initiated or generated by the arrival of a workpiece W in position above the platen. Referring to the cycle sequence diagram of FIG. 6, upon initiation of a cycle, solenoid F of speed control valve 56 and solenoid V of the directional control valve 42 are both energized. Energization of solenoid V shifts valve 42 to place outlet conduit 38 of the main system pump 30 in communication with conduit 44 and to place inlet conduit 40 of pump 30 in communication with conduit 46. This connection conditions both lift cylinders 14 and lift motor 18 to drive in a platen up direction.

Energization of solenoid F reverses the connections between the speed stop devices 62, 64 and the supply and sump conduits 52, 54. This causes the speed stops to shift in a direction increasing the output of main system pump 30'.

Figure 6:
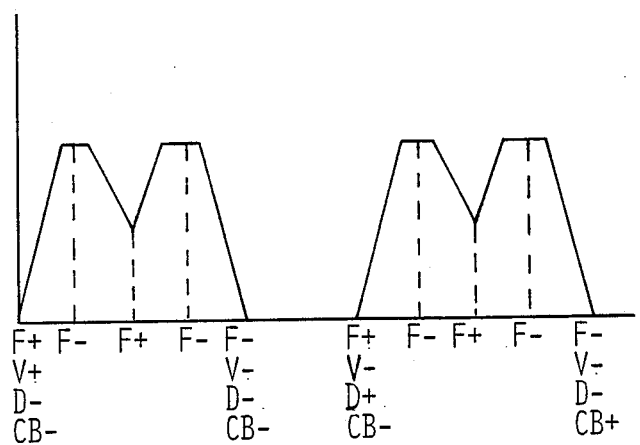
FIG. 6 is a schematic diagram of a cycle sequence of the hydraulic circuit of FIG. 1.

Referring now to the cycle sequence diagram of FIG. 6, the effective output of main system pump 30 at various stages in the cycle is plotted graphically above a table indicating which of the various solenoids F, V, D and CB are energized (+) or deenergized (−) at various stages in the cycle.

As stated above, at the commencement of an operating cycle, solenoid F of the speed control valve is energized and solenoid V of the directional control valve 42 is also energized to operate the lift cylinders 14 and motor 18 in their platen up direction. As previously stated, the acceleration control restriction 66 limits the rate at which the maximum speed stop device 64 can move toward its maximum speed position, hence the curve of FIG. 6 shows the rate of flow through pump 30 increasing steadily during the initial stages of the cycle. At some point into the cycle, the maximum speed stop may be engaged, after which the pump output will remain constant indicated by the flat portion at the left hand peak of the curve of FIG. 6.

As explained above, the mechanical coupling of the platen to piston rods 16 and to crank 22 of motor 18 automatically apportions the flow from pump 38 between the lift cylinders and lift motor so that the larger portion of this flow is delivered to the unit best suited to assume the load.

In order to slow the upward velocity of the rising platen as it approaches the workpiece W, at a selected point in the cycle the controller is actuated to de-energize solenoid F of the speed control valve, thus conditioning the speed stop devices to reduce the pump output, this reduction in the graph of FIG. 6 being indicated by the downwardly sloped section of the curve from the first peak.

As the platen engages the workpiece W, solenoid F is restored to its accelerating position by energizing the solenoid, thus again increasing the pump output. In the curve of FIG. 6, the pump output again reaches its maximum, indicated by the flat peak, and at some time prior to the arrival of the platen at its fully elevated position, speed control solenoid F is again de-energized to reduce the pump output so that the pistons 16, whose upward velocity is approximately proportional to the pump output, will not drive the workpiece into the locating device L at a relatively high speed.

When the platen reaches its uppermost or fully extended position, the controller de-energizes solenoid V, thus permitting valve 42 to return to its centered position, thus locking the fluid in the head ends of cylinders 14 to maintain the cylinders in their fully extended position. At this time, the crank is in the twelve o'clock position schematically indicated in FIG. 5 and also provides a mechanically locked configuration of the crank-link system to likewise hold the platen firmly in its elevated position.

The controller will then allow the system to maintain itself in this last state for a period of time sufficient for a work operation to be performed on the clamped workpiece. At the conclusion of this time, a lowering cycle is initiated by energizing speed control valve F to accelerate pump 30, while simultaneously energizing solenoid D of valve 42 to establish a connection between pump 30 and the lift cylinders and motor 18 which will drive these motors in their platen down direction. Again, at a selected point in the lowering cycle, speed control solenoid F is de-energized to reduce the output of pump 30 as the downwardly moving workpiece approaches the conveyor.

This decelerates the downward movement of crank 18 and pistons 14, and hence the platen, to a selected minimum speed as the workpiece moves into contact with the conveyor. The reduction of the pump output decreases its intake and a dynamic braking action is thus exerted on motor 18 and, at this point in the cycle, more importantly on the descending pistons.

Valve F is shifted again to an accelerating position after the workpiece is deposited on the conveyor, and again is de-energized as the platen approaches the bottom of its stroke to decelerate the platen to a gradual stop. When the platen finally reaches its lowered position, solenoid D is de-energized to enable the pump 30 to idle.

During the downward stroke, fluid displaced from accumulator 82 into counterbalance chamber 76 is returned to the accumulator to recharge the accumulator.

At the completion of the cycle, solenoid A of the counterbalance system is energized so that the accumulator is connected to the counterbalance system pump output to be topped off, if necessary.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. A hydraulic drive system for driving a platen in a forward and return reciprocatory stroke cycle, said system comprising a rigid platen, means for guiding said platen for forward and return movement along a fixed linear path between a rest position and an extended position, a crank arm mounted for rotation about a fixed axis normal to said linear path, link means coupling said crank arm to said platen for driving said platen from said rest position to said extended position upon rotation of said crank about said axis through 180 degrees in a first direction from a start position wherein said crank extends from said axis parallel to said linear path and for returning said platen from said extended position to said rest position upon rotation of said crank in the opposite direction from said finish position to said start position, first reversible hydraulic motor means for driving said crank in rotation about said axis, second motor means connected to said platen for driving said platen between said rest position and said extended position, variable speed hydraulic pump means for generating a variable flow of fluid under pressure to drive said first and second motor means, reversing valve means hydraulically connected across said pump means, and conduit means hydraulically connecting said first and second motor means in parallel with each other to said reversing valve means to enable said pump means to drive both said motor means in unison to cooperatively drive said platen in forward or return movement.

2. The invention defined in claim 1 further comprising control means for varying the speed of said pump means during each reciprocatory stroke cycle of said platen in a predetermined control cycle.

3. The invention defined in claim 2 wherein said control means are operable to decelerate said platen at a predetermined point in its stroke and to subsequently accelerate said platen prior to the arrival of said platen at the end of its stroke.

4. The invention defined in claim 1 wherein said linear path extends vertically upwardly from said rest position to said extended position and said second motor means comprises counterbalancing means for hydraulically counterbalancing at least a portion of the weight of said platen.

5. The invention defined in claim 4 wherein said counterbalancing means comprises means independent of said pump means for applying an upwardly directed pressure against said second motor means throughout its full range of movement.

* * * * *